United States Patent
Shibui et al.

(10) Patent No.: US 7,559,751 B2
(45) Date of Patent: Jul. 14, 2009

(54) SUPERCHARGER WITH ELECTRIC MOTOR

(75) Inventors: Yasuyuki Shibui, Tokyo (JP); Masahiro Shimizu, Tokyo (JP)

(73) Assignee: IHI Corporation, Tokyo (JP)

( * ) Notice: Subject to any disclaimer, the term of this patent is extended or adjusted under 35 U.S.C. 154(b) by 275 days.

(21) Appl. No.: 11/465,874

(22) Filed: Aug. 21, 2006

(65) Prior Publication Data
US 2007/0041851 A1    Feb. 22, 2007

(30) Foreign Application Priority Data
Aug. 22, 2005    (JP)    ............................. 2005-239266

(51) Int. Cl.
F02B 37/10    (2006.01)
F02B 39/10    (2006.01)

(52) U.S. Cl. .............. 417/374; 417/423.14; 417/423.1; 123/383; 123/559.1; 60/598; 60/607

(58) Field of Classification Search ................. 417/407, 417/423.1, 374, 572, 423.14; 60/607; 123/65 BA; 174/17.08, 21 R, 50.52, 75 R
See application file for complete search history.

(56) References Cited

U.S. PATENT DOCUMENTS

| | | | |
|---|---|---|---|
| 3,742,123 A * | 6/1973 | Haub, Jr. .................. | 174/138 F |
| 4,253,031 A | 2/1981 | Frister | |
| 4,745,755 A | 5/1988 | Kawamura | |
| 4,757,686 A | 7/1988 | Kawamura et al. | |
| 4,833,887 A | 5/1989 | Kawamura et al. | |
| 5,121,605 A | 6/1992 | Oda et al. | |
| 5,323,613 A | 6/1994 | Akiyama | |
| 5,605,045 A | 2/1997 | Halimi et al. | |
| 5,798,587 A | 8/1998 | Lee | |
| 5,834,117 A * | 11/1998 | Onishi ......................... | 428/379 |
| 5,857,332 A | 1/1999 | Johnston et al. | |

(Continued)

FOREIGN PATENT DOCUMENTS

DE    41 15 273 C1    6/1992

(Continued)

OTHER PUBLICATIONS

Notice of Allowance issued in related U.S. Appl. No. 11/463,665, mailed Dec. 19, 2007.

(Continued)

*Primary Examiner*—Devon C Kramer
*Assistant Examiner*—Christopher Bobish
(74) *Attorney, Agent, or Firm*—Griffin & Szipl, P.C.

(57) ABSTRACT

A supercharger with an electric motor includes, a turbine impeller rotationally driven by an exhaust gas, a compressor impeller rotationally driven by rotation of the turbine impeller, a compressor housing accommodating the compressor impeller, a turbine housing accommodating the turbine impeller, a shaft coupling the turbine impeller and the compressor impeller, a bearing housing rotatably supporting the shaft, an electric motor accommodated in an inside of the bearing housing for assisting rotation of the turbine impeller, and a power supply line extending from an inside to an outside of the bearing housing. The power supply line has one end portion connected to the electric motor, and the other end portion connected to a connector that receives electric power. The connector is installed at a position that is away from a side of the turbine impeller, and is less affected by heat of the exhaust gas.

5 Claims, 4 Drawing Sheets

U.S. PATENT DOCUMENTS

| | | | |
|---|---|---|---|
| 5,870,894 A * | 2/1999 | Woollenweber et al. ....... 60/607 |
| 5,904,471 A | 5/1999 | Woollenweber et al. |
| 6,032,466 A | 3/2000 | Woolenweber et al. |
| 6,102,672 A | 8/2000 | Woolenweber et al. |
| 6,129,524 A | 10/2000 | Woollenweber et al. |
| 6,145,314 A | 11/2000 | Woollenweber et al. |
| 6,160,332 A | 12/2000 | Tsuruhara |
| 6,218,747 B1 | 4/2001 | Tsuruhara |
| 6,257,834 B1 | 7/2001 | Bremer et al. |
| 6,278,199 B1 | 8/2001 | Grant et al. |
| 6,293,769 B1 | 9/2001 | Radermacher et al. |
| 6,416,281 B1 | 7/2002 | Bremer et al. |
| 6,449,950 B1 | 9/2002 | Allen et al. |
| 6,609,375 B2 | 8/2003 | Allen |
| 6,647,724 B1 | 11/2003 | Arnold et al. |
| 6,668,553 B1 | 12/2003 | Ghizawi |
| 6,986,648 B2 | 1/2006 | Williams et al. |
| 7,010,916 B2 | 3/2006 | Sumser et al. |
| 7,360,361 B2 | 4/2008 | Prusinski et al. |
| 2003/0051475 A1 | 3/2003 | Allen et al. |
| 2003/0118461 A1 | 6/2003 | Hodapp et al. |
| 2006/0123783 A1 | 6/2006 | Philippe |
| 2006/0245913 A1 | 11/2006 | Thiele et al. |
| 2007/0036664 A1 | 2/2007 | Shibui et al. |

FOREIGN PATENT DOCUMENTS

| | | |
|---|---|---|
| DE | 100 22 113 A1 | 11/2001 |
| DE | 101 56 704 A1 | 5/2003 |
| DE | 10 2005 052 363 A1 | 5/2007 |
| EP | 0 079 100 A1 | 5/1983 |
| EP | 0 212 988 | 3/1987 |
| EP | 0 304 259 A1 | 2/1989 |
| EP | 1 348 848 A2 | 10/2003 |
| FR | 2 859 499 A1 | 3/2005 |
| GB | 2 021 874 A | 12/1979 |
| JP | 01019122 | 1/1989 |
| JP | 1-171006 | 7/1989 |
| JP | 02-99722 | 4/1990 |
| JP | 03138430 A | 6/1991 |
| JP | 05199708 A | 8/1993 |
| JP | 06346748 A | 12/1994 |
| JP | 07102988 A | 4/1995 |
| JP | 2000-130176 | 5/2000 |
| JP | 2000-514897 | 11/2000 |
| JP | 3389748 B2 | 3/2003 |
| JP | 2003-293785 | 10/2003 |
| JP | 2004-044451 | 2/2004 |
| JP | 2004-44452 | 2/2004 |
| JP | 2005-069178 | 3/2005 |
| WO | WO 98/02652 | 1/1998 |
| WO | 98/30790 A2 | 7/1998 |
| WO | 98/30790 A3 | 7/1998 |
| WO | 2005/024202 A1 | 3/2005 |
| WO | 2005028876 A1 | 3/2005 |
| WO | WO 2005024202 A1 * | 3/2005 |
| WO | 2005/113961 A1 | 12/2005 |

OTHER PUBLICATIONS

Office Action issued in related U.S. Appl. No. 11/462,807, mailed Dec. 19, 2007.
Office Action issued in related U.S. Appl. No. 11/463,665, mailed Aug. 3, 2007.
Office Action issued in related U.S. Appl. No. 11/462,807, mailed Aug. 3, 2007.
Search Report issued in corresponding European application No. 06 01 7066 completed Oct. 16, 2006.
Extended European Search Report issued in related application No. 06 01 6269, completed Oct. 10, 2007.
Extended European Search Report issued in related application No. 06 01 6455, completed Oct. 12, 2007.
Office Action issued in related U.S. Appl. No. 11/463,090, dated Jul. 10, 2007.
Office Action issued in related co-pending U.S. Appl. No. 11/462,807, mailed May 22, 2008.
Co-pending U.S. Appl. No. 12/280,816, filed Aug. 27, 2008.
Co-pending U.S. Appl. No. 11/617,211, filed Dec. 28, 2006.
Office Action issued on Jan. 5, 2009 in related co-pending U.S. Appl. No. 11/617,247.
Notice of Allowance issued on Dec. 30, 2008 in related co-pending U.S. Appl. No. 11/462,807.
European Search Report issued in related application No. 06026496. 7, completed Feb. 10, 2009 and mailed Feb. 19, 2009.

* cited by examiner

SUPERCHARGER WITH ELECTRIC MOTOR

This application claims priority from Japanese Patent Application No. 2005-239266, filed Aug. 22, 2005, the entire disclosure of which is incorporated herein by reference.

BACKGROUND OF THE INVENTION

1. Field of the Invention

The present invention relates to a supercharger mounted on the engine or and like, and specifically to a supercharger that has an electric motor for assisting turbine rotation of the supercharger in a low speed rotation range of an engine. More specifically, the present invention relates to a supercharger with an electric motor in which a power supplying connector for driving the electric motor can be made compact.

2. Description of Related Art

The supercharger is used, for example, for a high output of an automotive engine. In the supercharger, a turbine impeller of a turbine is rotated by exhaust energy of the engine, and the output of the turbine rotates a compressor impeller of a compressor. Thereby, a compressed air is supplied to the engine from the compressor to obtain a supercharged state in the engine in which the air intake is greater than natural air intake.

In the supercharger, the turbine hardly works in a low speed rotating region of the engine, due to a low exhaust flow rate from the engine. As a supercharger solving the problem, there is a supercharger with an electric motor in which the electric motor that assists acceleration of the supercharger is provided for improving a turbo effect in a low speed rotation range. For example, such a supercharger is disclosed in patent document 1 (patent document 1: Japanese Patent National Publication of translated version No. 2000-514897 "Motor Assisted Supercharger for Internal Combustion Engine"). The electric motor of the supercharger has, as an output shaft, a shaft coupling a turbine impeller and a compressor impeller. By this structure, the electric motor assists operation of the supercharger by receiving electric power from an outside of the supercharger.

FIG. 1 is a cross sectional view of a supercharger with an electric motor according to the related art. In FIG. 1, an electric motor 11 includes a rotor 11a provided in a shaft 5, and a stator 11b provided in an outer side in a radial direction from the rotor 11a. The rotor 11a is constituted by a plurality of permanent magnets arranged in a circumferential direction, and the stator 11b is constituted by a plurality of coils 17 arranged in the circumferential direction. In FIG. 1, there is arranged a power supply line 19 for supplying electric power to the electric motor 11. The power supply line 19 has one end portion connected to the stator 11b of the electric motor 11, and the other end portion connected to a connector 31. The connector 31 is provided in an outer circumferential surface of a bearing housing 6 to receive electric power. A terminal 28 supplying the electric power is connected to the connector 31.

The connector 31 in FIG. 1 is greatly affected by heat from the engine, and heat of an exhaust gas flowing within a turbine housing 7. In other words, the supercharger is exposed to a high-temperature ambient atmosphere. Accordingly, the connector 31 provided in an outer circumferential surface of the bearing housing 6 is required to stand such a high temperature. For this reason, a thickness of the outer wall of the connector 31 is increased for the purpose of increasing a heat insulating property between the inside and outside of the connector 31. As a result, the connector 31 is increased in size. Accordingly, since a supercharger main body is increased in size to such a degree and the weight thereof is increased, a mounting trouble can occur when mounting the supercharger on the engine.

SUMMARY OF THE INVENTION

Accordingly, an object of the present invention is to provide a supercharger with an electric motor that can lower necessary heat insulating ability of a connector connected to a power supply line extending from an electric motor, and can make the connector compact to that degree.

In order to achieve the above object, according to the present invention, there is provided a supercharger with an electric motor comprising:

a turbine impeller rotationally driven by an exhaust gas;

a compressor impeller rotationally driven by rotation of the turbine impeller to compress air;

a compressor housing accommodating the compressor impeller in an inside thereof;

a turbine housing accommodating the turbine impeller in an inside thereof;

a shaft coupling the turbine impeller and the compressor impeller;

a bearing housing rotatably supporting the shaft;

an electric motor accommodated in an inside of the bearing housing for assisting rotation of the turbine impeller; and a power supply line extending from an inside to an outside of the bearing housing, and having one end portion connected to the electric motor and the other end portion connected to a connector that receives electric power, the connector being installed at a position that is away from a side of the turbine impeller, and is less affected by heat of the exhaust gas.

In the present invention, the connector, to which the power supply line extending from the electric motor to the outside of the bearing housing is connected, is installed at a position that is away from a side of the turbine impeller, and is less affected by heat of the exhaust gas. Accordingly, it is possible to reduce the influence that is exerted on the connector by the heat of the engine or the exhaust gas thereof. Therefore, it is possible to make a heat resistance of the connector lower than in the conventional case to make the connector more compact to that degree.

According to a preferred embodiment of the present invention, the power supply line is coated with a film in an outside of the bearing housing, and the film has a flexibility property and a heat insulating property.

Thereby, it is possible to arrange the connecter at a desired position by freely bending the power supply line while the power supply line is insulated from the heat. Therefore, it is possible to freely adjust a position and a direction of the connector in accordance with a shape of the engine on which the supercharger is mounted.

Further, according to a preferred embodiment of the present invention, the power supply line is covered with a pipe-shaped member that can freely change a shape thereof and has a heat insulating property, and the connector is fixed to the pipe-shaped member.

Thereby, it is possible to freely change the shape of the pipe-shaped member, and to arrange the connector at a desired position.

Further, according to a preferred embodiment of the present invention, a plurality of attachment portions are formed in the bearing housing or the compressor housing, an attaching member attachable to and detachable from any one of the plurality of attachment portions is attached to any one of the plurality of attachment portions, and a connector fixing portion to which the connector is fixed is formed in the attaching member.

Thereby, the connector can be fixed to the supercharger main body via the attaching member in the attachment portion that is selected from a plurality of attachment portions in accordance with engine arrangement, device arrangement around the engine, or the like. Accordingly, it is possible to easily fix the connector by selecting the attachment position, in accordance with engine arrangement, device arrangement around the engine, or the like.

According to a preferred embodiment of the present invention, an outer circumferential surface of the bearing housing has a circular portion of which cross section perpendicular to an axial direction is formed in a circular shape, first and second attaching members are attached to the circular portion, each of the first and second attaching members having a semicircular arc portion that conforms to the shape of the circular portion, and the first and second attaching members are coupled such that the semicircular arc portions are fitted to the circular portion, the first attaching member has a protruding portion that extends from the bearing housing side to the compressor housing side in a state where the first attaching member is fitted to the circular portion, a connecting fixing portion is formed in the protruding portion to be positioned in the vicinity of the compressor housing in a state where the first attaching member is fitted to the circular portion, the connector being fixed to the connecting fixing portion.

Since the first and second attaching members have the semicircular arc portions that conform to the shape of the circular portion of the bearing housing, it is possible to attach the first and second attaching members to the bearing housing while freely adjusting the position thereof in the circumferential direction. Accordingly, it is possible to freely adjust the fixed position of the connector fixed to the first attaching member in the circumferential direction. Further, since the first attaching member has the protruding portion extending to the compressor housing side from the bearing housing side, and the connector is fixed to the protruding portion, it is possible to fix the connector to the portion in the vicinity of the compressor housing of a relatively low temperature.

According to a preferred embodiment of the present invention, the connector is fixed to any one of a plurality of connector fixing portions that are formed in the compressor housing such that the connector can be fixed to any one thereof.

Since a plurality of connector fixing portions to which the connector can be fixed are previously formed in the compressor housing of a comparatively low temperature, it is possible to easily fix the connector to the connector fixing portion at the position in accordance with engine arrangement, device arrangement around the engine, or the like.

As described above, according to the present invention, the connector, to which the power supply line extending from the electric motor to an outside of the bearing housing is connected, is installed at a position that is away from a side of the turbine impeller, and is less affected by heat of the exhaust gas. Accordingly, it is possible to reduce the influence that is exerted on the connector by the heat of the engine or the exhaust gas thereof. Therefore, it is possible to make a heat resistance of the connector lower than in the conventional case, so that it is possible to make the connector more compact to that degree.

The other objects and advantageous features of the present invention will be apparent from the following description with reference to the accompanying drawings.

DESCRIPTION OF THE PREFERRED EMBODIMENTS

Figure 1:
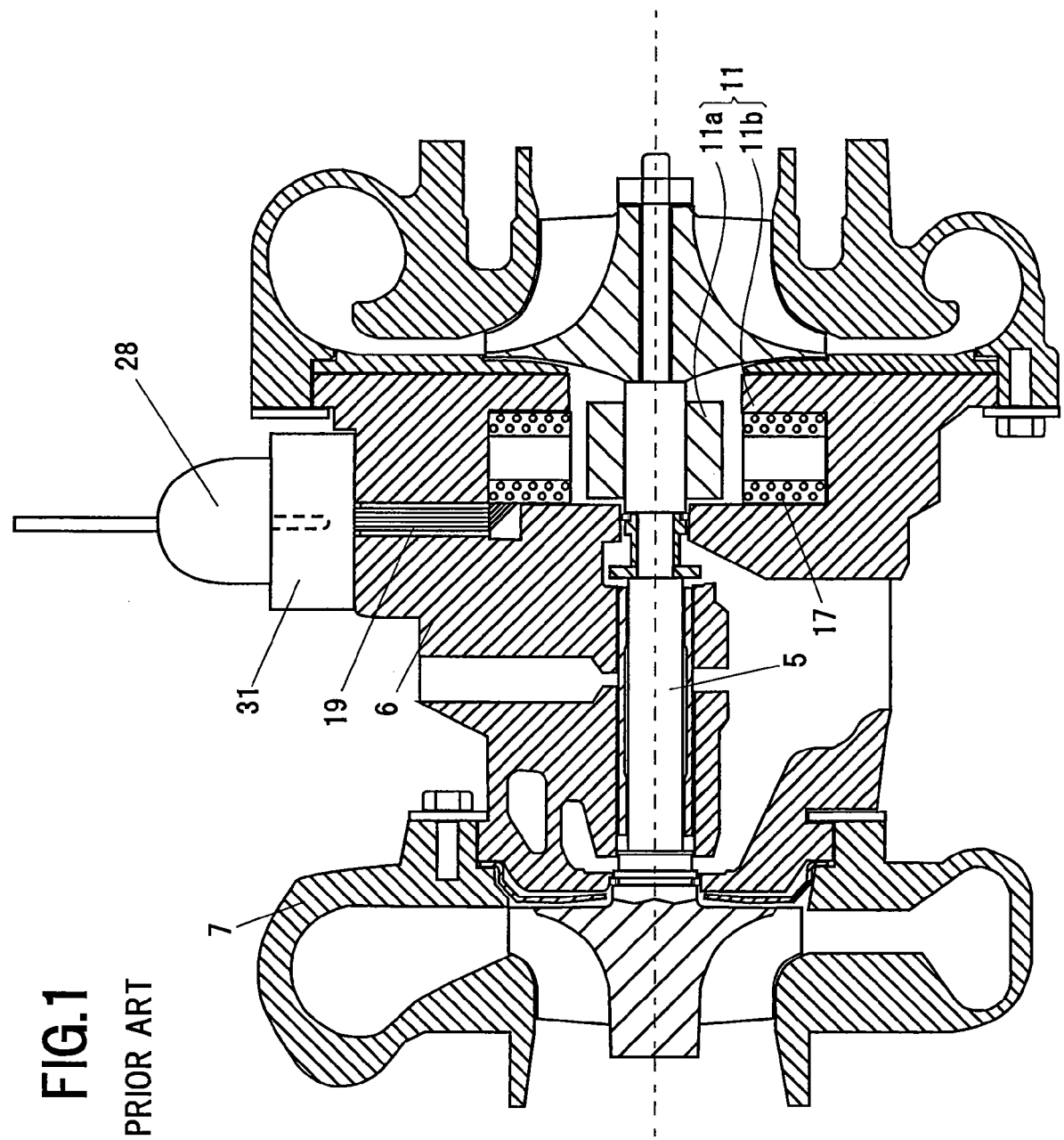
FIG. 1 is a cross sectional view showing a supercharger with an electric motor according to the related art.

Preferred embodiments of the present invention will be described with reference to the accompanying drawings. The same reference numerals are attached to the common portions in each of the drawings, and overlapping description will be omitted.

Figure 2:
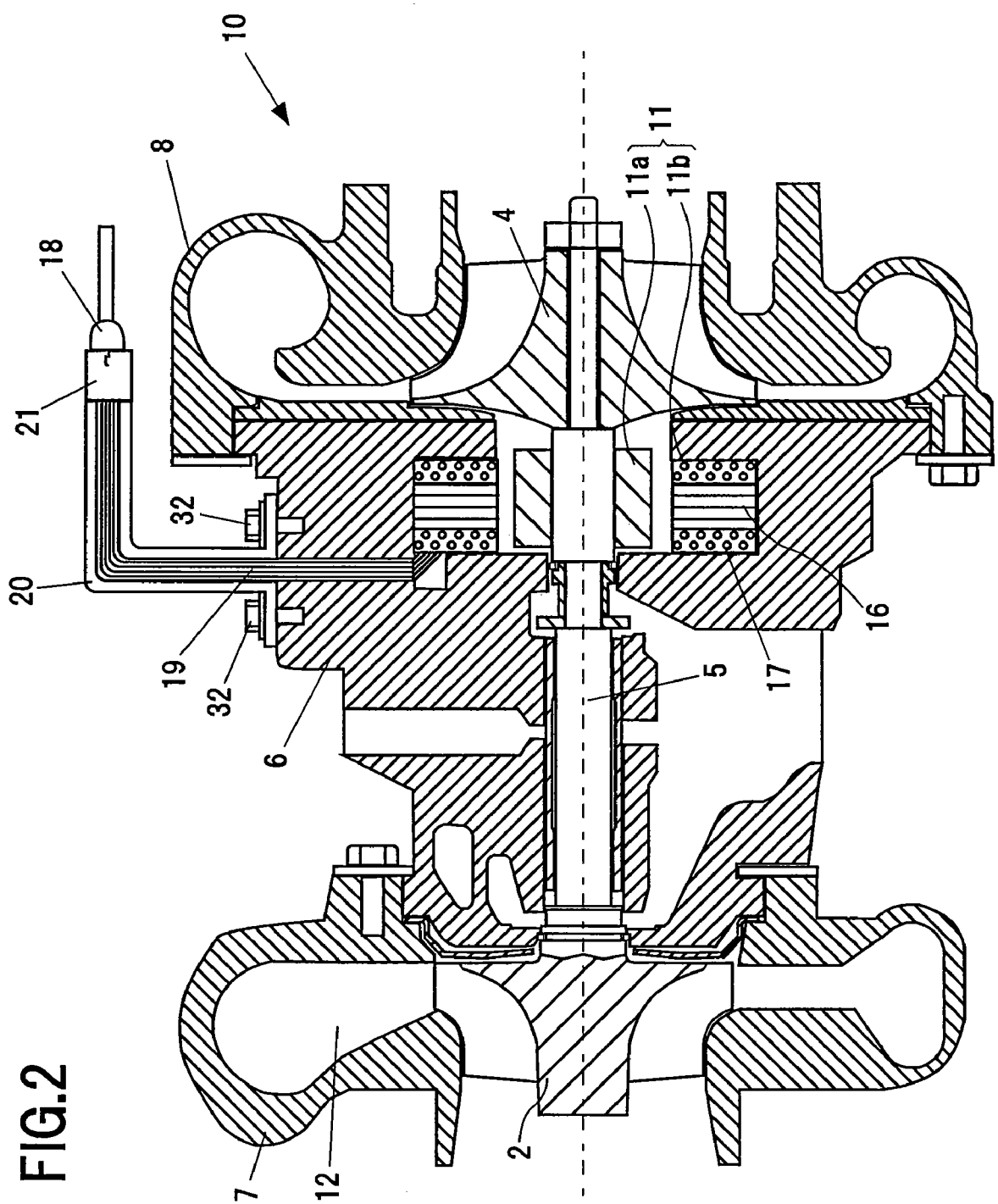
FIG. 2 is a cross sectional view showing a supercharger with an electric motor according to an embodiment of the present invention.

A supercharger 10 with an electric motor shown in FIG. 2 includes a turbine impeller 2 rotationally driven by an exhaust gas from an engine, a compressor impeller 4 rotationally driven by a drive force of the turbine so as to supply a compressed air to the engine, a shaft 5 coupling the turbine impeller 2 and the compressor impeller 4, a bearing housing 6 rotatably supporting the shaft 5, a turbine housing 7 accommodating the turbine impeller 2 in an inner side in a radial direction, a compressor housing 8 accommodating the compressor impeller 4 in an inner side in a radial direction, and an electric motor 11 assisting an acceleration of the supercharger 10 in a low speed rotation range of the engine.

In the supercharger 10 with the electric motor shown in FIG. 2, in the same manner as in a usual supercharger, an exhaust gas from the engine is introduced to a scroll 12 formed in the turbine housing 7, and is fed in the turbine impeller 2 in the inner side in the radial direction from the scroll 12. The turbine impeller 2 is rotationally driven by the fed-in exhaust gas, and the compressor impeller 4 is accordingly rotated. Therefore, an air is sucked and compressed by the rotation of the compressor so as to be supplied to the engine. Further, since a flow rate of the exhaust gas is small in the low-speed rotation region of the engine, the electric motor 11 is operated to assist the rotational acceleration of the shaft 5.

The structure of the electric motor 11A will be described briefly. The electric motor 11 is provided in an inner portion of the bearing housing 6 so as to have the shaft 5 as an output shaft. The electric motor 11 includes a rotor 11a provided in the shaft 5, and a stator 11b provided in an outer side in a radial direction from the rotor 11a. The rotor 11a is constituted by a plurality of permanent magnets arranged in a circumferential direction, for example. Meanwhile, the stator 11b has, as constituting elements, a plurality of the coils 17 arranged in a circumferential direction, for example. Each coil 17 is a coil wound around a plurality of laminated steel plates 16. The electric motor 11 is a three-phase ac motor, for example. The electric motor 11 is controlled by controlling an electric current flowing through the coils 17 of the stator 11b. Thereby, acceleration assist of the supercharger 10 is controlled.

A power supply line 19 is arranged for supplying electric motor to the electric motor 11. The power supply line 19 extends to a connector 21 in an outside of the bearing housing 6 from the stator 11b, and electrically connects the stator 11b and the connector 21. The connector 21 receives electric power necessary for operating of the electric motor 11. The power supply line 19 is covered with a pipe-shaped member 20 having a heat insulating property to be protected from a high-temperature ambient atmosphere.

As shown in FIG. 2, the connector 21 is fixed to a leading end portion of the pipe-shaped member 20. A rear end portion of the pipe-shaped member 20 is fixed to the bearing housing 6 by a fixing member such as a bolt 32 or the like. Further, the pipe-shaped member 20 has flexibility so as to be freely bent. Accordingly, the shape of the pipe-shaped member 20 can be changed in accordance with engine arrangement, device arrangement around the engine, or the like. In other words, it is possible to freely arrange the pipe-shaped member 20 in accordance with an arrangement position of the engine, a layout of devices around the engine, a layout of piping and wiring around the engine, or the like. Further, since the pipe-shaped member 20 has flexibility, it is possible to freely arrange the connector 21 connected to the pipe-shaped member 20 at a position less affected by the heat of the engine and the exhaust gas. Further, a control line of the electric motor 11 may pass through the inside of the pipe-shaped member 20.

In place of the pipe-shaped member 20, the power supply line 19 may be covered with other materials having proper heat insulating property and flexibility. For example, it is possible to employ a cable formed by coating the power supply line 19 with a film having a heat insulating property and flexibility. In this case, in the same manner, it is possible to arrange the cable in accordance with engine arrangement, device arrangement around the engine, or the like to arrange the connector 21 at a desired position while protecting the power supply line 19 in the inside of the cable from a high temperature.

Figure 3:
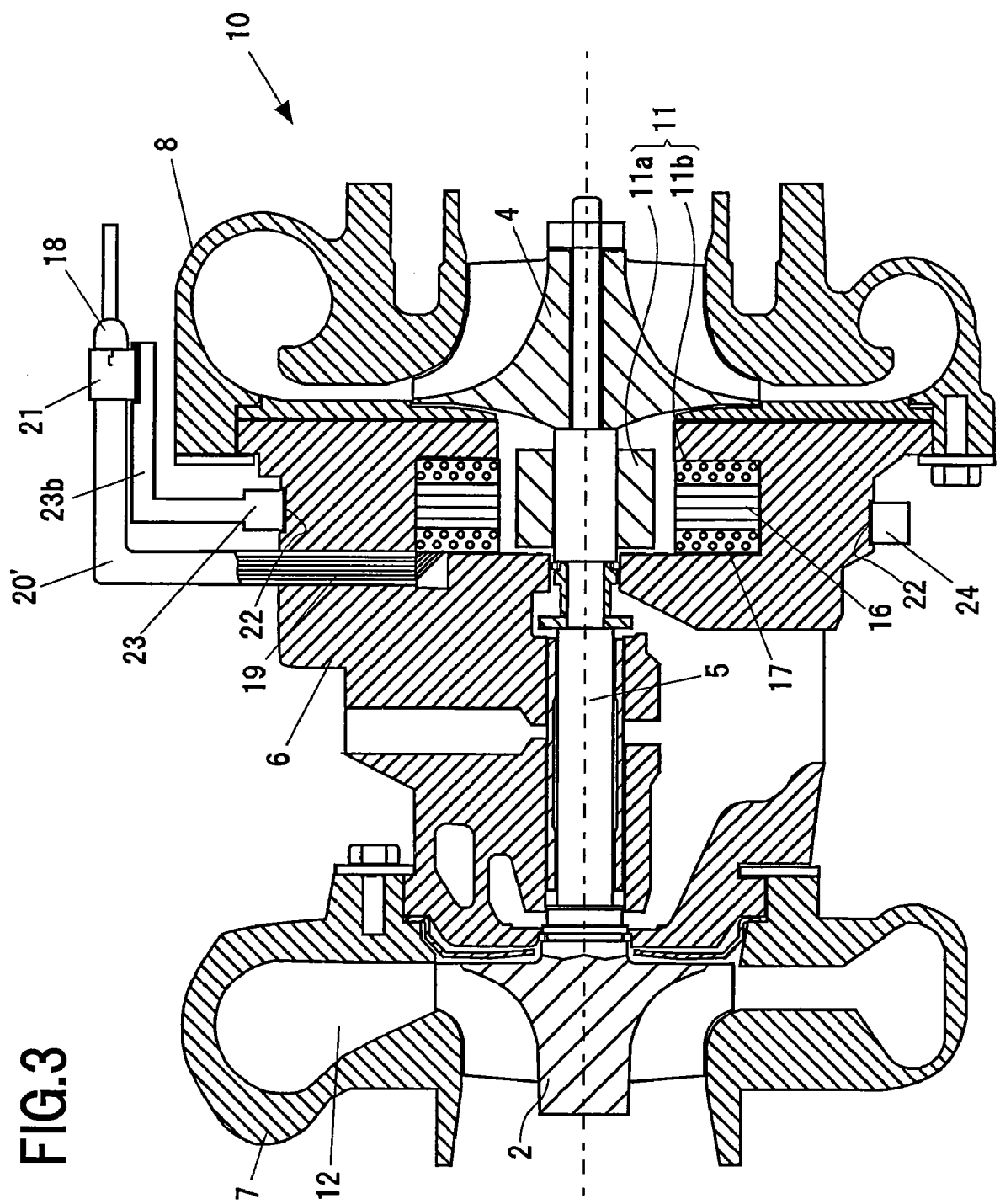
FIG. 3 is a cross sectional view showing a supercharger with an electric motor according to another embodiment of the present invention.
Figure 4:
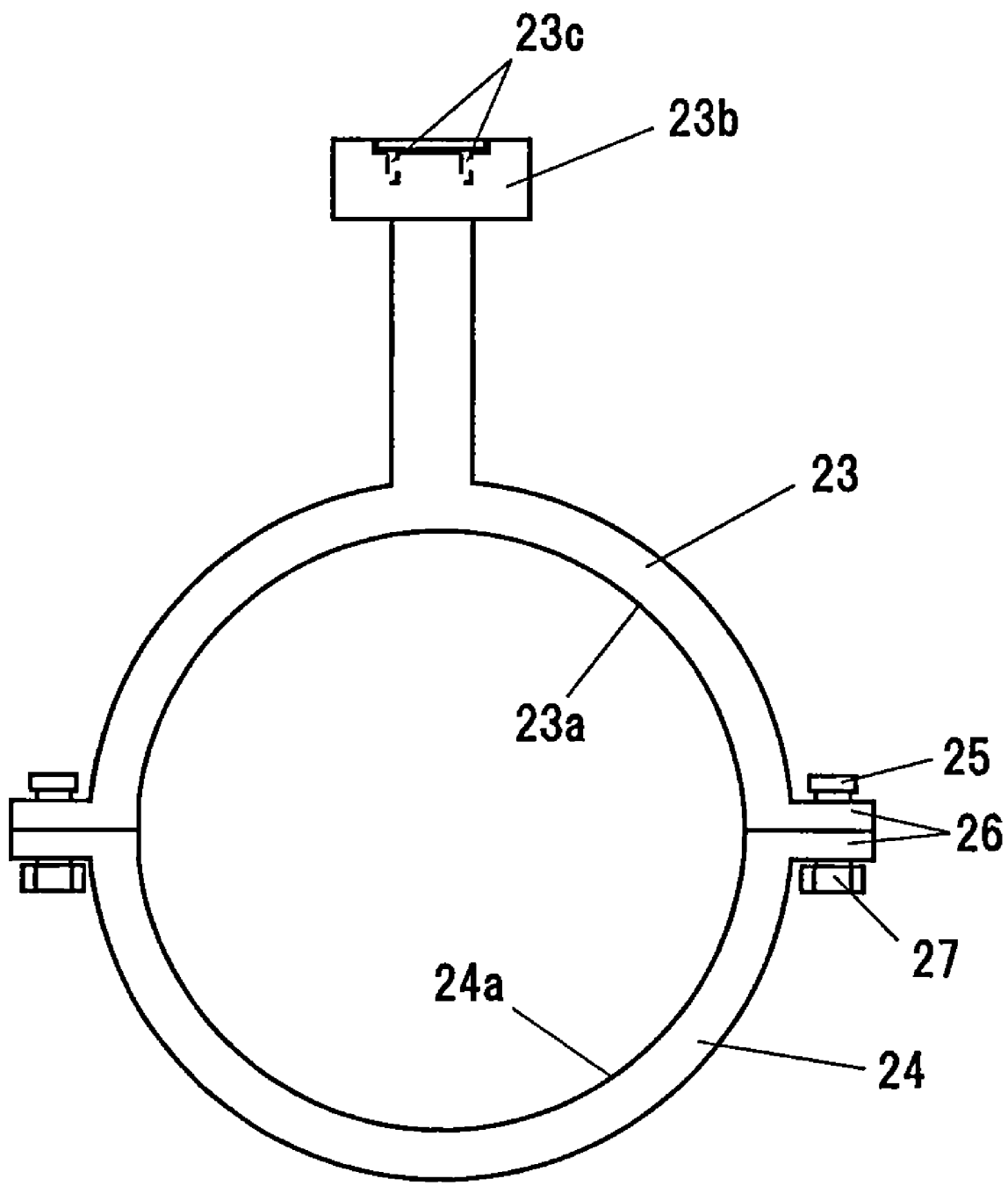
FIG. 4 is a view seen from an axial direction and showing attaching members attached to a bearing housing of the supercharger in FIG. 3.

FIG. 3 is a cross sectional view showing a supercharger with an electric motor according to another embodiment of the present invention. The reference numeral 20' denotes a cable covering the power supply line 19. Another fixing method of the connector 21 will be described with reference to FIG. 3. The connector 21 can be attached to the supercharger main body via an additional component. The additional component is an attaching member having a proper shape easily attached to the supercharger main body. FIG. 4 is a view showing the attaching members 23 and 24 when seen from an axial direction in FIG. 3. As shown in FIG. 4, a circular portion 22 is formed in an outer circumferential surface of the bearing housing 6 so as to have a predetermined length in the axial direction. The circular portion 22 has a cross section perpendicular to the axial direction that is formed in a circular shape. The attaching members 23 and 24 are attached to the circular portion 22. For that reason, the first and second attaching members 23 and 24 respectively have semicircular arc portions 23a and 24a conforming to the shape of the circular portion 22. The first and second attaching members 23 and 24 are coupled such that the respective semicircular arc portions 23a and 24a are fitted to the circular portion 22. Coupling portions 26 extending to an outer side in a radial direction are formed in both ends of each of the semicircular arc portions 23a and 24a. Each of the coupling portions 26 includes a through hole. The first and second attaching members 23 and 24 are coupled by aligning the through holes of the coupling portions 26, passing a bolt 25 through the through holes from one side and engaging a nut 27 with the bolt 25 at the other side so that the first and second attaching members 23 and 24 can be attached to the bearing housing 6. Dimensions of the first and second attaching members 23 and 24 can be set so as to obtain a sufficient contact pressure of the first and second attaching members 23 and 24 against the circular portion 22 at the time of coupling the first and second attaching members 23 and 24 to be attached to the circular portion 22. Thereby, the first and second attaching members 23 and 24 are not displaced from the attached position. Further, in order to facilitate attachment of the attaching members 23 and 24, it is preferable that the circular portion 22 is a groove to which the semicircular arc portions 23a and 24a of the attaching members 23 and 24 are fitted. In this case, the circular portion 22 functions as the attachment portion. A terminal 18 for supplying the electric power is connected to the connector 21.

Further, the first attaching member 23 has a protruding portion 23b extending to the compressor housing 8 from the bearing housing 6 in a state where the first attaching member 23 is attached to the circular portion 22. In the leading end portion of the protruding portion 23b, a connector fixing portion 23c is formed to be positioned near the compressor housing 8. The connector 21 can be fixed to the connector fixing portion 23c in a state where the first attaching member 23 is attached to the circular portion 22. The connector 21 is attached to the connector fixing portion 23c to fix the connector 21 to a position in the vicinity of the compressor housing 8 of a relatively lower temperature. The connector fixing portion 23c is a screw hole, for example. A hole (not shown) corresponding to the screw hole 23c is formed in the connector 21 so that the connector 21 can be fixed to the screw hole 23c of the protruding portion 23b by using a screw. The connector fixing portion is not limited to the screw hole, but may be other proper fixing means.

Since the first and second attaching members 23 and 24 respectively have the semicircular arc portions 23a and 24a conforming to the shape of the circular portion 22 of the bearing housing 6, it is possible to freely adjust an attached position of the first and second attaching members 23 and 24 in the circumferential direction. Accordingly, it is possible to freely adjust the fixed position of the connector 21 fixed to the first attaching member 23 in the circumferential direction, in accordance with engine arrangement, device arrangement around the engine, or the like. Further, the first attaching member 23 has the protruding portion 23b extending to the side of the compressor housing 8 from the side of the bearing housing 6, and the connector 21 is fixed to the protruding portion 23b. Thereby, it is possible to fix the connector 21 in the vicinity of the compressor housing 8 of a relatively low temperature. In other words, it is possible to easily fix the connector 21 at the position where a temperature is relatively low, only by attaching the attaching members 23 and 24 to the circular portion 22 so as to freely adjust the position in the circumferential direction, and fixing the connector 21 to the connector fixing portion 23c of the attaching member, at the time of mounting the supercharger 10 on the engine.

In the above, a pair of the attaching members, which are the additional components separate from the components of the supercharger main body, are attached to the circular portion 22 of the bearing housing 6. However, the present invention is not limited to this. In other words, the attaching member may be attachable to and detachable from a plurality of other proper positions of the supercharger main body such as the compressor housing 8, the bearing housing 6 and the like, and the connector 21 may be fixed to the attaching member attached to any one of a plurality of the above proper positions. In this case, the shape of the attaching member is not limited to the shape described above, but may have a proper shape conforming to the shape of the attachment portion of the attaching member to the supercharger main body. For example, bolt holes, screw holes or the like are previously provided as the attachment portion at a plurality of positions of the supercharger main body, the attaching member is attached by using the bolt holes, the screw holes or the like, and the connector 21 is fixed to the connector fixing portion formed in the attaching member.

As is different from the above, the connector 21 may be fixed to a position which is less affected by the heat, without using the attaching member that is the additional component. For example, the connector 21 may be fixed directly to the compressor housing 8. In this case, screw holes or the like are previously formed as connector fixing portions at a plurality of proper positions in the compressor housing 8 that will not become obstacle positions, and through holes corresponding to the screw holes are formed in the connector 21. Accordingly, it is possible to fix the connector 21 to the screw hole at the proper position, at the time of mounting the supercharger 10 on the engine. It is possible to determine which of the screw holes the connector 21 is fixed to, in accordance with the shape of the engine to which the supercharger 10 is mounted. Further, since an air from the outside is sucked to the compressor housing 8, the connector 21 attached to the compressor housing 8 can avoid the adverse effect by the heat from the engine and the turbine side. Accordingly, the heat insulating property of the connector 21 may be lower than that of the conventional one to make the connector 21 compact in size to that degree. In this case, the portion where the screw hole can be formed in the compressor housing 8 may be a protruding portion. Also, an attaching direction of the connector 21 can be determined in accordance with the shape of the engine. Further, the fixing method and means of the connector 21 are not limited to the above, but the connector 21 may be fixed in accordance with other proper methods and means.

The present invention is not limited to the embodiments described above, but can be variously modified within the scope of the present invention.

What is claimed is:

1. A supercharger with an electric motor, the supercharger comprising:
   a turbine impeller rotationally driven by an exhaust gas;
   a compressor impeller rotationally driven by rotation of the turbine impeller to compress air;
   a compressor housing accommodating the compressor impeller in an inside thereof;
   a turbine housing accommodating the turbine impeller in an inside thereof;
   a shaft coupling the turbine impeller and the compressor impeller;
   a bearing housing rotatably supporting the shaft;
   an electric motor accommodated in an inside of the bearing housing for assisting rotation of the turbine impeller; and
   a power supply line extending from the inside to an outside of the bearing housing, and having one end portion connected to the electric motor and the other end portion connected to a connector that receives electric power, wherein
   the connector is installed at a position that is away from a side of the turbine impeller, and is less affected by heat of the exhaust gas, and wherein
   an outer circumferential surface of the bearing housing has a circular portion having a cross section that is perpendicular to an axial direction and which is formed in a circular shape, and first and second attaching members are attached to the circular portion, each of the first and second attaching members have a semicircular arc portion that conforms to the shape of the circular portion, and the first and second attaching members are coupled such that the semicircular arc portions are fitted to the circular portion, wherein
   the first attaching member has a protruding portion that extends from a bearing housing side to a compressor housing side in a state wherein the first attaching member is fitted to the circular portion, and
   a connecting fixing portion is formed in the protruding portion to be positioned in the vicinity of the compressor housing in a state wherein the first attaching member is fitted to the circular portion, and the connector is fixed to the connecting fixing portion.

2. The supercharger with an electric motor according to claim 1, wherein the power supply line is coated with a film outside of the bearing housing, wherein the film has a flexibility property and a heat insulating property.

3. The supercharger with an electric motor according to claim 1, wherein the power supply line is covered with a pipe-shaped member that freely changes a shape thereof and has a heat insulating property, and the connector is fixed to the pipe-shaped member.

4. The supercharger with an electric motor according to claim 1, wherein a plurality of attachment portions are formed in the bearing housing or the compressor housing, and
   an attaching member attachable to and detachable from any one of the plurality of attachment portions is attached to any one of the plurality of attachment portions, and
   a connector fixing portion to which the connector is fixed is formed in the attaching member.

5. The supercharger with an electric motor according to claim 1, wherein the connector is fixed to any one of a plurality of connector fixing portions that are formed in the compressor housing so that the connector can be fixed to any one of the plurality of connector fixing portions.

* * * * *